Dec. 21, 1943.   R. W. COMPO   2,337,452
METHOD OF MAKING CONTAINER CLOSURES
Filed Dec. 2, 1940

Inventor
ROBERT W. COMPO
By Owen & Owen
Attorneys

Patented Dec. 21, 1943

2,337,452

UNITED STATES PATENT OFFICE 2,337,452

METHOD OF MAKING CONTAINER CLOSURES

Robert W. Compo, Defiance, Ohio

Application December 2, 1940, Serial No. 368,112

1 Claim. (Cl. 113—121)

This invention relates to a method of making a container closure quickly and accurately, and which provides a tight and permanent seal that is proof against pressure from within the container.

An object of the invention is to provide a method which provides for curling a closure into place upon the end of a tubular container without danger of buckling of the container walls and without regard to the exact length of the container.

Details of the invention and its objects will appear as the description proceeds.

In the accompanying drawing forming a part of this specification.

Figure 1:
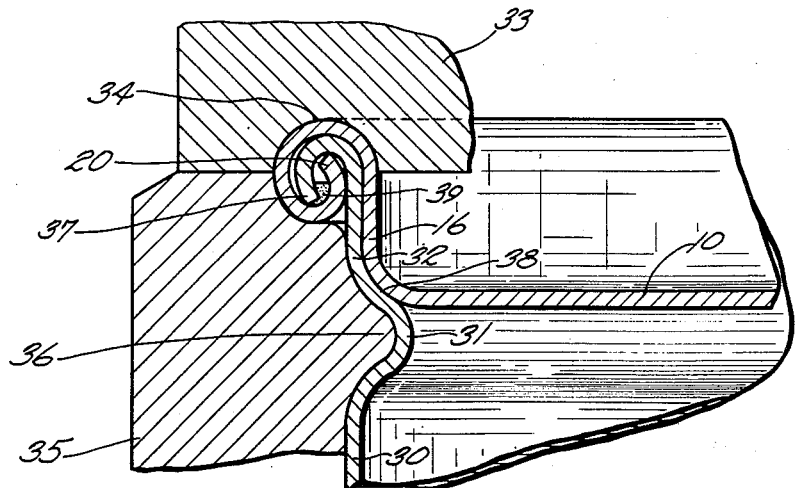

Fig. 1 is a section through a container-closing seam embodying one form of the invention and indicating the dies by which the final step of formation is produced.

Figs. 2 to 7, inclusive, illustrate successive stages in the manufacture of the closure member and its application to the body of the container.

The method of producing the seam will be discussed before the details of the completed seam are pointed out.

Figure 2:
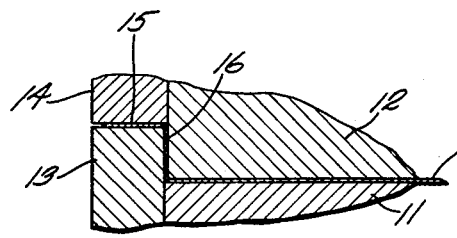

As indicated in Fig. 2, a plain sheet metal closure member 10 is positioned between pressure members 11 and 12 and then is subjected to the action of dies 13 and 14 which clamp between them the edge 15 of the sheet and draw it to form a shoulder at 16.

Figure 3:
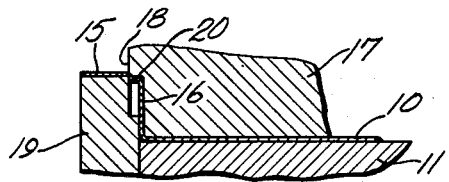

Fig. 3 shows the next step where the flange 15 is nipped off between a die 17 having a cutting shoulder 18 and a die 19. This operation produces an outwardly curved flange 20 at the end of portion 16.

Figure 4:
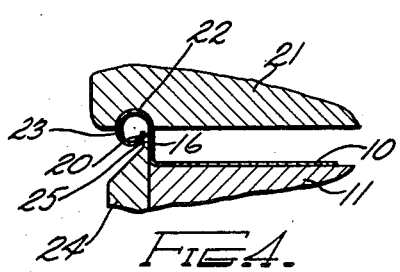
Figure 7:
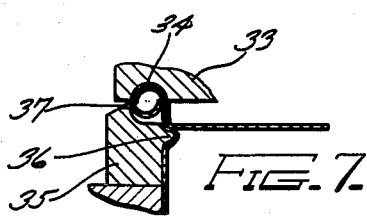

As shown in Fig. 4, the next step comprises the application of a die 21 having a curved recess 22 to the edge 20 of flange 16 by means of which the edge is given a pre-curl 23. A lower die 24 having a projecting flange 25 has the flange inserted between edge 20 and drawn portion 16, preferably as a final step of this pre-curling operation, so that the edge 20 is definitely spaced from portion 16 by flange 25.

Figure 5:
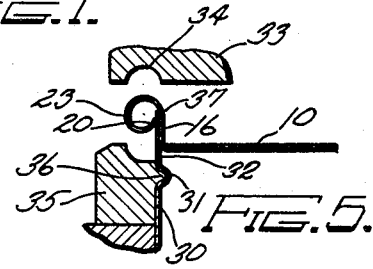
Figure 6:
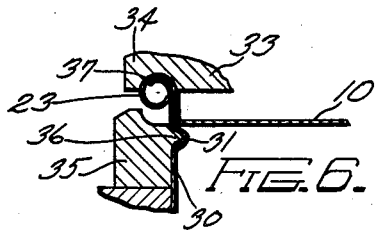

The closure as thus prepared is ready for application to the body member. As indicated in Fig. 5, the body member 30 has therein an inwardly directed bead 31 near the end with a straight extension 32 between the bead and the end of the body member. A die 33 having a curved recess 34 similar to recess 22 is employed to press the prepared closure member 10 down upon end 32 of the body member, this end being inserted between edge 20 and portion 16 of the closure member. The body member is supported by a die 35 having a projection 36 fitting into bead 31. The upper edge 37 of portion 32 is curled around within pre-curl 23, as indicated in Fig. 6, until the lower edge of the pre-curl 23 encounters the upper side of die 35, After this the pre-curl 23 is compressed so that edge 20 is pressed up to the position in which it is shown in Fig. 1. The parts are preferably so proportioned that at the completion of the operation indicated in Fig. 1, the edge 20 is substantially at the top of the curl formed by portion 32, while the edge 37 is substantially at the bottom of pre-curl 23. As will be seen from enlarged detail view (Fig. 1) the edges of the sheet at 20 and 37 are pressed directly against the side of the adjoining sheet and, this joint being made by compression between dies in the manner described, it will be readily understood that this joint remains tight, the resiliency of the metal tending to maintain the edges of the metal in perfect contact with the faces of the adjacent sheets.

At the same time it is preferable to have the dies so proportioned that at the conclusion of the pressing operation, indicated in Fig. 1, the curve at the bottom of portion 16 of the closure member rests firmly against the upper portion of bead 31 in the body member.

There are several advantages in employing bead 31. In the first place, it is helpful in holding the body member securely in place during the application of the closure member thereto. If the bead 31 were omitted, there would be no convenient way of securely holding the body member against endwise movement during the application of closure member except by an abutment at the other end of the body member. In many cases, the body member has such a length in proportion to its thickness that it is likely to buckle under the compression exerted upon the end being closed if this pressure is withstood only by an abutment at the opposite end of a body member. Another advantage of employing the bead is that it can be readily formed an exactly predetermined distance from the end of the body and, by positioning the body in the manner shown, the position of the edge 32 is exactly predetermined.

In making mufflers and other articles to which this method readily applies, for example, the body member is not always of exactly accurate length and with the employment of bead 31 slight differences in the over-all length of the body are immaterial. Also, bodies which are intentionally of different lengths may be closed with the same holding member 35 where dependence is placed upon the bead rather than upon an abutment at the opposite end of the body member.

In addition to the convenience of the arrangement and the accuracy of positioning portion 32, there is also the advantage of the additional seal at 38 which has been described above. At first glance, it might be thought that pressure from within against closure 10 would tend to separate the closure member from the body member at 38, but the tendency of the end 32 to bend about the central line of bead 31 counteracts to some extent any such tendency.

As indicated above, edges 20 and 37 are very firmly pressed into sealing relation to the adjoining sheet faces during the sealing operation and are maintained in that position by the tendency of the metal to slightly uncurl. At the same time, pressure upon the closure member 10 merely tends to draw tighter the two seals at the edges 37 and 20. Under ordinary circumstances the three seals at 20, 37 and 38, respectively are amply sufficient to make a reliable closure of the container. However, if still further protection is desired, any preferred form of sealing material or cement may be introduced into the pre-curl 23 before the closure member is applied to the body member. If desired, the pre-curled closure member may be turned over from the position in which it is shown in Figs. 4 and 5 and the desired amount of cement readily poured in through the space between edge 20 and portion 16. If the closure member 10 is then again turned to the position in which it is shown in Fig. 5, it will be readily understood that the cement will be retained within the portion of pre-curl 23 which is then disposed on the downward side. During the seam-forming operation, edge 37 follows around within pre-curl 23 so that its edge is pressed firmly into the cement.

In Fig. 1, the cement is indicated at 31 since it may be employed or not, as preferred, it is not indicated in diagrammatic Figures 2 to 7, inclusive. It will be readily understood that by slight increase in amount of the cement, it might be caused to completely fill the space between edges 37 and 20.

The advantages of bead 31 during the sealing operation and from the standpoint of retaining the seal after it has been formed have been pointed out above. It is also readily apparent from inspection of Fig. 1 that a construction of this kind imparts a very desirable appearance to the closed end of the container.

While the broad idea disclosed above may be applied in closing containers of various kinds, it is particularly adapted for closing the end of the tubular body of a muffler or the like, since the seam stands up well and maintains a tight joint under the conditions to which a muffler is subjected in use.

What I claim is:

The method of closing a container having a tubular body member and a closure member of sheet metal which comprises forming an inwardly directed bead near one end of the tubular member, pressing the closure sheet and turning up its edges until it will nest within the end of the body member, curling the upturned edge of the sheet outward in a continuous curve until the upturned wall of the sheet is shorter than the distance between said bead and the end of the body member, assembling the parts with the end of the body member within the curl at the edge of the closure member, and then applying pressure directly to the bead and the curled edge of the closure member and pressing them towards each other until the edge of the body member is curled within the curled edge of the closure member and the closure member rests against the bead.

ROBERT W. COMPO.